Figure 1:
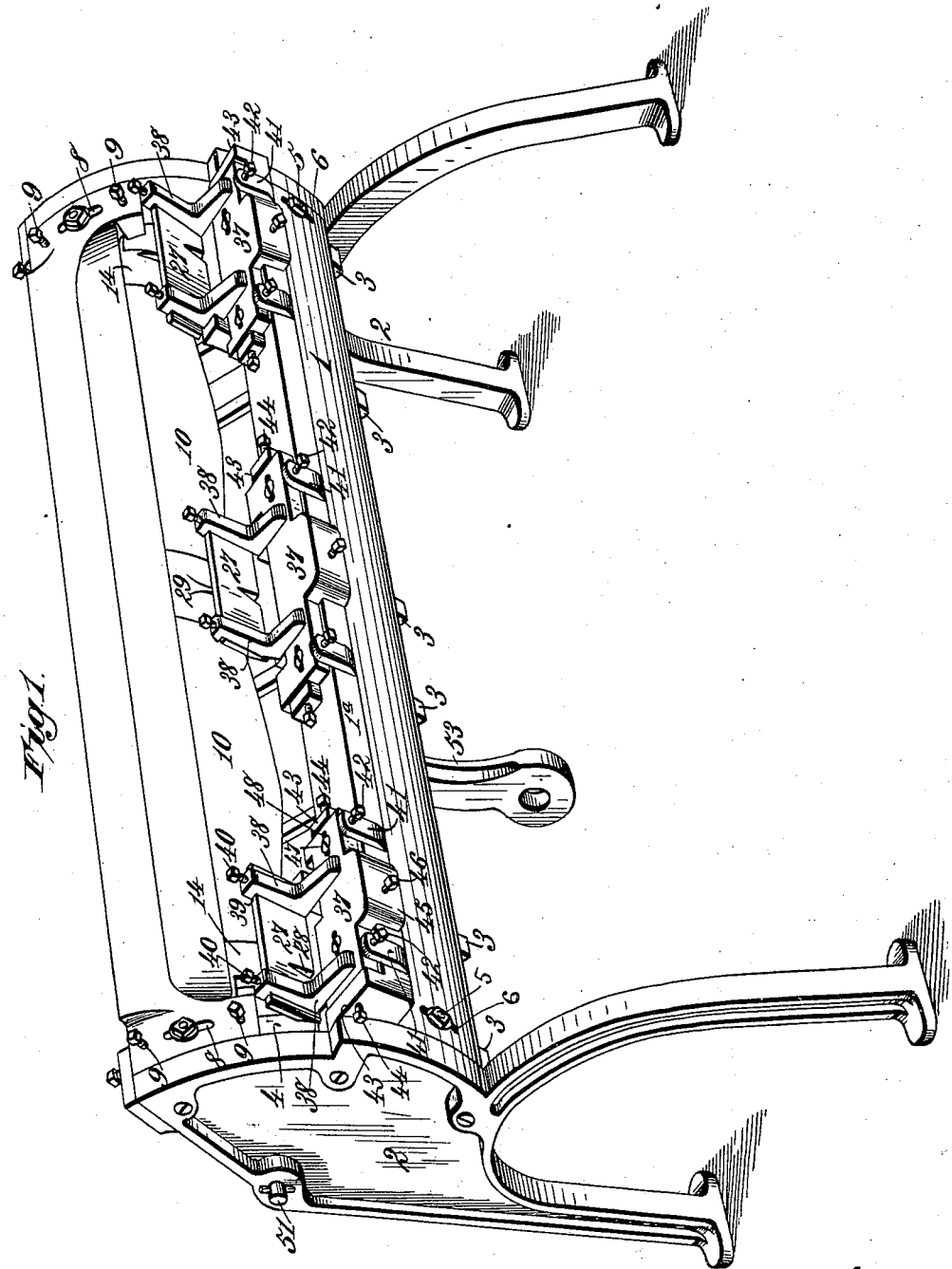

(No Model.) 4 Sheets—Sheet 1.

C. W. RICH.
MACHINE FOR CUTTING BARREL STAVES.

No. 485,566. Patented Nov. 1, 1892.

(No Model.) 4 Sheets—Sheet 2.

C. W. RICH.
MACHINE FOR CUTTING BARREL STAVES.

No. 485,566. Patented Nov. 1, 1892.

Witnesses.
Robert Everitt.
J. A. Rutherford.

Inventor:
Charles W. Rich.
By James L. Norris.
Atty.

(No Model.) 4 Sheets—Sheet 3.
C. W. RICH.
MACHINE FOR CUTTING BARREL STAVES.
No. 485,566. Patented Nov. 1, 1892.
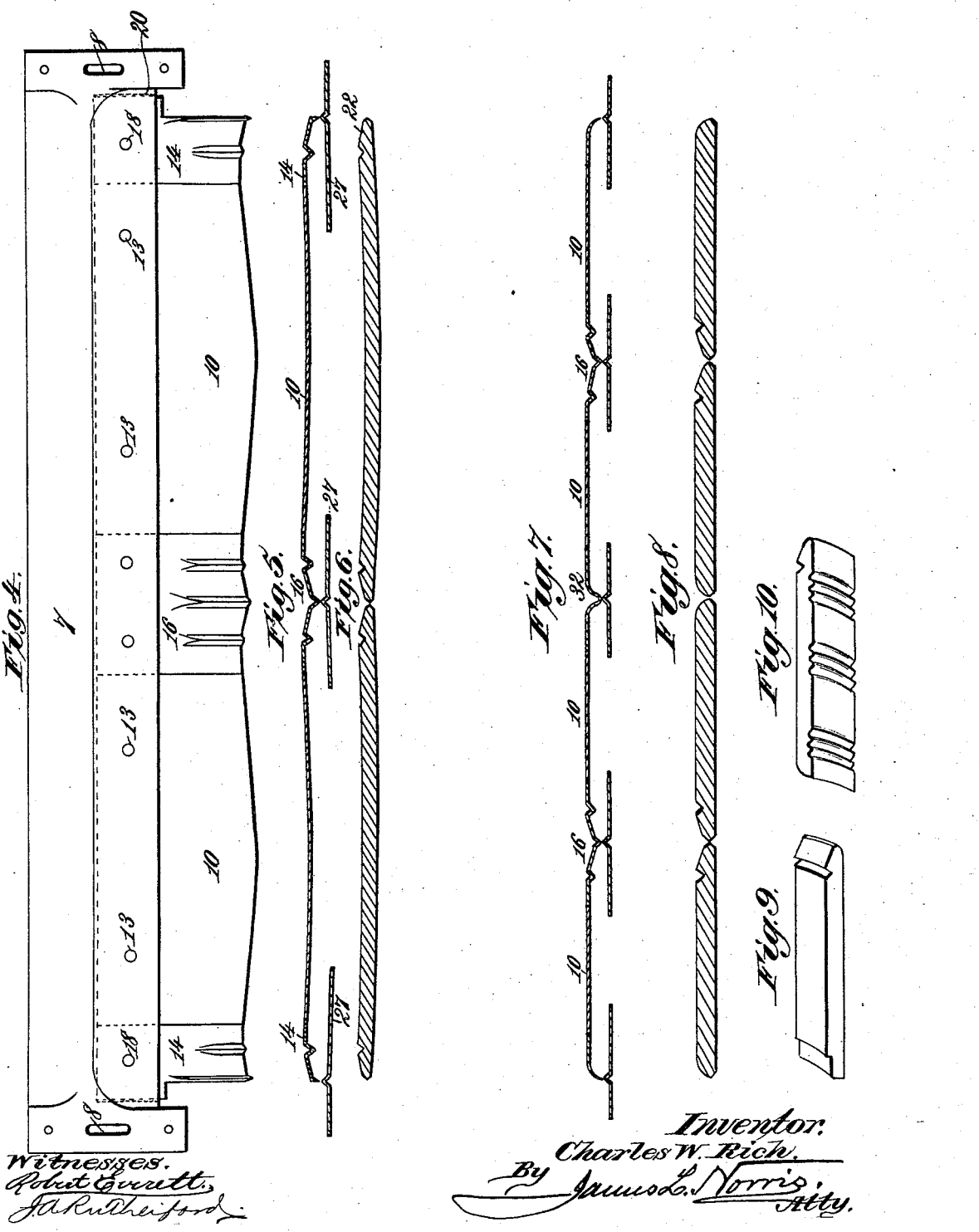
Witnesses.
Robert Everitt,
J. A. Rutherford
Inventor:
Charles W. Rich.
By James L. Norris,
Atty.

(No Model.) 4 Sheets—Sheet 4.
C. W. RICH.
MACHINE FOR CUTTING BARREL STAVES.
No. 485,566. Patented Nov. 1, 1892.
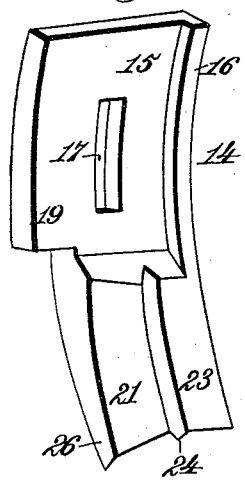
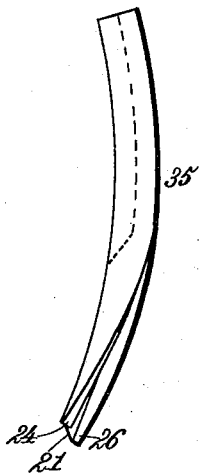
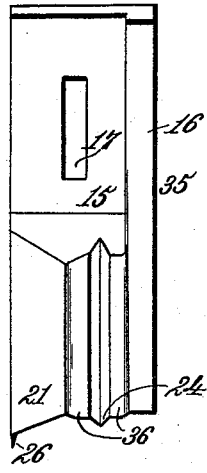
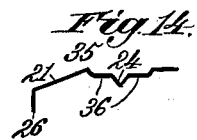
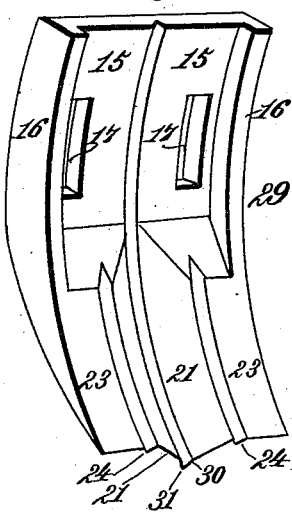
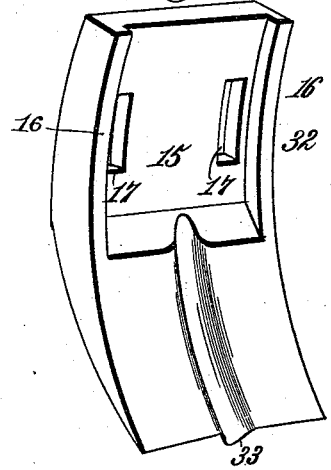
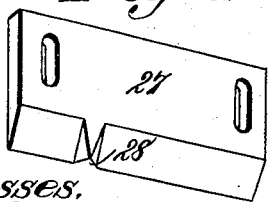
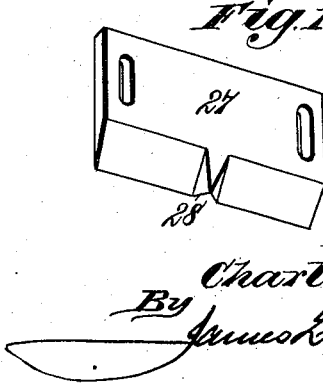
Witnesses.
Robert Everett.
J. A. Rutherford.
Inventor.
Charles W. Rich.
By James L. Norris.
Atty.
THE NORRIS PETERS CO., PHOTO-LITHO., WASHINGTON, D. C.

UNITED STATES PATENT OFFICE.

CHARLES WILLIS RICH, OF SUMMERTOWN, ASSIGNOR TO HIMSELF, AND LUTHER L. FRIERSON, OF MOUNT PLEASANT, TENNESSEE.

MACHINE FOR CUTTING BARREL-STAVES.

SPECIFICATION forming part of Letters Patent No. 485,566, dated November 1, 1892

Application filed October 6, 1891. Serial No. 407,932. (No model.)

*To all whom it may concern:*

Be it known that I, CHARLES WILLIS RICH, a citizen of the United States, residing at Summertown, in the county of Lawrence and State of Tennessee, have invented new and useful Improvements in Machines for Cutting Barrel-Staves, of which the following is a specification.

My invention relates to that type of mechanism for the manufacture of staves for small barrels, casks, tubs, pails, and similar articles in which a stave bolt or block is subjected to the action of a cutter or cutters for the purpose of severing staves from said stave block or bolt and simultaneously equalizing, crozing, and chamfering the same, the present invention relating more specifically to the mechanism shown, described, and claimed in an application for Letters Patent filed by me upon the 30th day of June, 1891, and numbered 398,055.

The purposes of my present invention are to improve the construction and operation of stave-cutting mechanism of the class shown in my pending application; to provide for the formation at a single operation of a plurality of short staves of the kind used in casks, kegs, pails, and tubs or other articles, each of said staves, be the same two or more, being equalized, chamfered, and crozed at both ends, severed from the contiguous stave or staves, and completely finished at a single operation of the stave-forming mechanism, and to render it possible to produce at a single operative movement of the stave-forming mechanism a plurality of completely-finished staves, each being equalized, curved longitudinally to form the swell or bilge of the barrel, and having a transverse curvature corresponding with the circular form, and those staves which are to be employed in the manufacture of tubs, pails, or firkins, and for similar uses having a suitably-rounded edge, rabbet, or other preferred shape imparted to one end simultaneously with the formation of a chamfer and croze upon the other end.

It is a further purpose of my invention to provide means for the complete formation at a single operative act of a plurality of short staves suitable for the manufacture of kegs, casks, tubs, pails, and similar articles, said staves being equalized, chamfered, and crozed at both ends or chamfered and crozed at one end and suitably shaped at the other, each stave being severed from the contiguous stave or staves simultaneously with its formation; to provide chamfering and crozing tools or knives which may be detachably combined with the stave-cutting knife or knives and be interchangeable with howeling-knives, with rabbet-cutting tools, or with devices for rounding or otherwise shaping the staves at one end; to provide means for the removal of the residual ribs from the exterior faces of the staves and to render such devices vertically and horizontally adjustable, and to provide means for forming exterior transverse ribs or ribs and grooves upon the staves for ornamental or other purposes at the time of formation of the chamfered, crozed, and equalized stave and by the same single operation.

To these several purposes my invention consists in the several novel features of construction and combinations of parts hereinafter fully described, and particularly defined in the claims, for the clear understanding of which, in order to enable those skilled in the art to practice my said invention, I will now describe the same in detail, reference being had to the accompanying drawings, in which—

Figure 2:
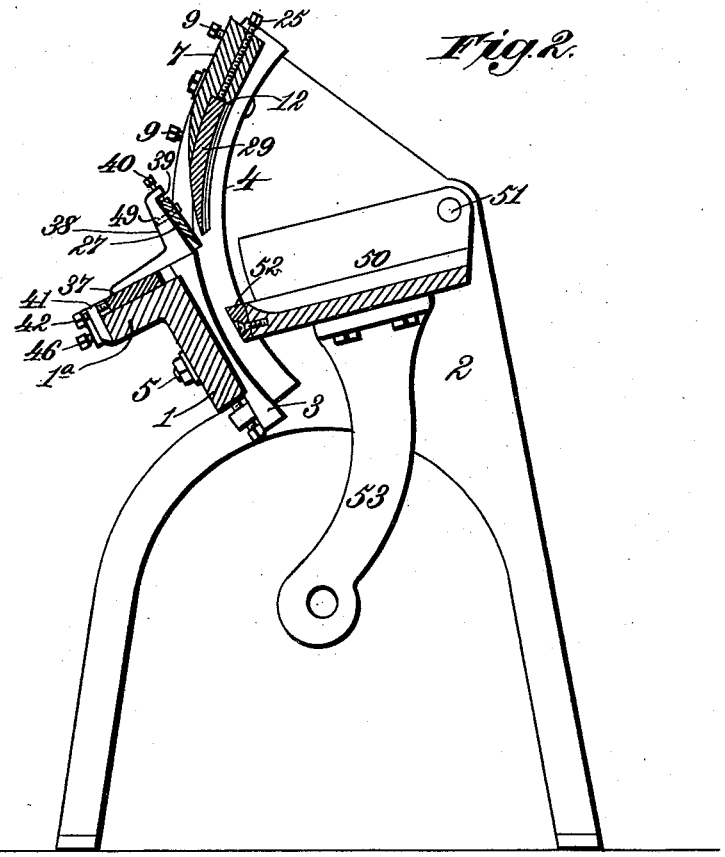
Figure 3:
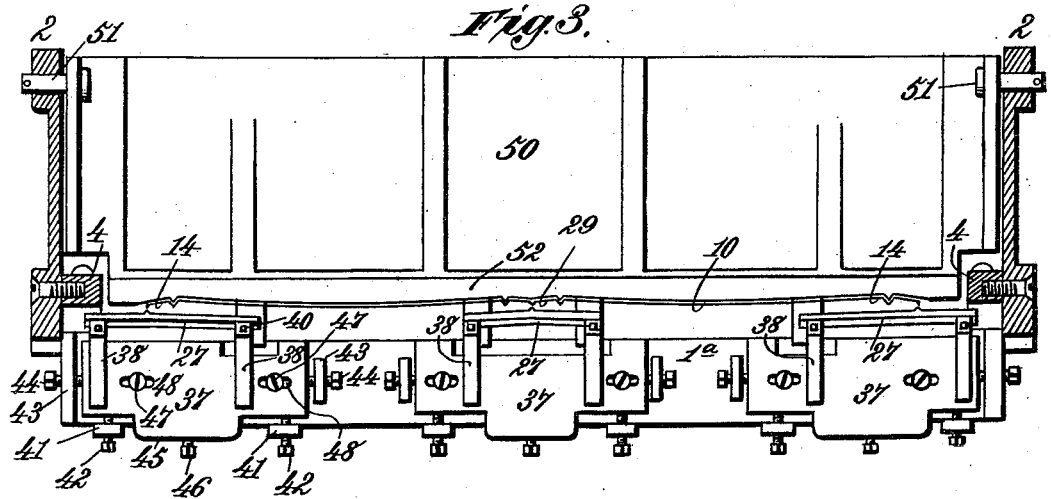

Figure 1 is a perspective view of my improved stave-machine. Fig. 2 is a transverse vertical section of the same, taken on the line *x x*, Fig. 3. Fig. 3 is a horizontal section on the line *y y*, Fig. 2. Fig. 4 is a detail rear view of the stave-cutting knife and knife-supporting bar. Fig. 5 is a detail longitudinal section view of the stave cutting, crozing, and chamfering knives and the severing and rib-removing cutters. Fig. 6 is a longitudinal section of the staves formed by the knives shown in Fig. 5. Fig. 7 is a longitudinal section of knives which may be substituted for those shown in Fig. 5. Fig. 8 is a longitudinal section of a plurality of staves formed by the knife shown in Fig. 7. Fig. 9 is a perspective view of a stave, showing a construction in which one end is rabbeted and the other crozed and chamfered. Fig. 10 is a similar view showing a slightly-modified construction of the stave, which is provided with exterior ribs or ribs and channels alternately. Fig. 11 is a detail perspective view of a crozing and chamfering knife forming a part of my improved machine. Fig. 12 is an edge view or side elevation of the crozing and chamfering knife shown in Fig. 11. Fig. 13 is a front elevation or face view of a howeling-knife, and Fig. 14 is a diagram of the cutting-edge of the same. Fig. 15 is a detail perspective of the duplex crozing and chamfering knife for forming the contiguous ends of two adjacent staves. Fig. 16 is a detail view of the severing, trimming, and edge-rounding knife substituted for the duplex crozing and chamfering knife when only one end of the stave is to be crozed and chamfered. Fig. 17 is a diagram of the cutting-edge of the knife shown in Fig. 16. Fig. 18 is a detail perspective of the single rib-removing knife, and Fig. 19 is a similar view of the duplex form of the same.

In the said drawings the reference-numeral 1 indicates a horizontal guide-supporting bar mounted at its ends upon end frames 2 and provided at suitable intervals with guides 3, having concave faces. These guides are secured to the bar 1 in any suitable manner and are used to support the stave-bolt as the stave-cutting knife acts thereon, as more fully shown hereinafter. At each end the guide-supporting bar is adjustably mounted upon a strong curved rib or thick flange 4, which is either formed or mounted upon the end frame 2, from the inner face of which it projects. The guide-supporting bar is bolted to the convex faces of these ribs by bolts 5, passing through elongated bolt-openings 6 to permit its adjustment. I may arrange the guides 3 at any suitable interval of separation; but for the purposes of my present invention I prefer to arrange one of said guides upon each side and at a short distance from the line of separation, between the contiguous ends of the adjacent staves formed by each single operation, as shown in Fig. 1, in which the machine, as illustrated, is equipped for the formation of four staves at each operation. This number may, within certain limits, be increased, as required, the only restriction in this respect being the convenient length of the machine and the practical considerations as to construction and operation which are familiar to all who are skilled in the art.

Upon the ribs or flanges 4, at or near their upper ends, is attached the knife-supporting bar 7, the ends of which are prolonged transversely to the bar to provide an extended point of support and permit the formation of bolt-openings 8 of proper length to render the bar adjustable. Bolts 9 are tapped through the extremities of the said bar to rest upon the ribs 4 and afford means for giving adjustment at right angles to the plane of the knife.

Upon the knife-supporting bar 7 is mounted a knife 10 or a plurality of knives, so arranged when two or more are used that they will practically form the equivalent for a single blade having the portions required for the formation of a stave duplicated one or more times. In other words, I may use separately-constructed knives for the separate staves, arranged in substantially the same cutting-plane, or I may incorporate a series of such knives in a single integral blade, my invention being without restrictions in this particular. The stave-cutting knife 10 in either form of construction is arranged in a recessed seat in the lower edge of the knife-supporting bar 7, as shown in Fig. 2, its back or edge abutting against a shoulder 12 on the knife-supporting bar 7, which takes up the strain or thrust of the knife, which is fastened in place by screws or bolts 13, passing through the body of the blade and tapped into the bar 7. This portion of the knife, which cuts the body of the stave, consists of a plate of steel of suitable length having a slight curvature longitudinally to cut upon a line corresponding with the curvature of the stave, by which the swell or bilge of the barrel is produced. Said knife is also curved transversely to cut in a line corresponding with the circular form of the cask, keg, or other article. The longitudinal curvature is shown in Fig. 5 and the transverse curvature in Fig. 2. In many articles, however—such as pails, tubs, and other structures—the staves are not curved longitudinally, but are straight, or substantially so, as shown in Figs. 8, 9, and 10. In the formation of such staves, therefore, the stave-cutting knife will be substantially straight-edged so far as the longitudinal line of cut is regarded.

Referring to Figs. 4 and 5, the reference-numeral 14 indicates a crozing and chamfering knife, which, as shown, is formed as a separate part or piece, though it may, if preferred, be an integral portion of the stave-cutting knife. As the crozing and chamfering knives wear more rapidly than the stave-cutting knives and usually require sharpening more frequently, I prefer to construct them separately and render them detachable and adjustable. Ordinarily, therefore, I form them substantially as shown in Figs. 11 and 12. The body of the knife consists of a thick plate having the upper portion of its face cut away or removed to form a recess 15, a lateral rib 16 being left upon one side. In or near the center of the body portion is a longitudinal slot 17 to receive a bolt 18, which passes into or through the knife-supporting bar 7 at a point beyond the end of the stave-cutting knife, against the end of which the rib 16 abuts. The other side of the recessed portion has a lateral extension 19, which rests with its vertical edge against a shoulder 20 upon the end of the knife-supporting bar. The crozing and chamfering knife is provided below the recess 15 with a cutter or blade having a chamfering portion 21 lying at such an angle as to cut the beveled face 22 of the chine. The blade is also provided with a cutting portion or section 23, which joins and forms a practical extension of the stave-cutting knife 10. Between the section 23 and the chamfering portion 21 is the crozing portion 24, usually consisting of an angular or substantially-V-shaped projection integral with the sections 21 and 23, as clearly shown in the detail views, Figs. 5, 11, and 12. The upper end or recess portion of the crozing and chamfering knife rests beneath the shoulder 12 of the knife-supporting bar 7, through which are tapped set-bolts 25, their ends abutting against the end of the knife, as seen in Fig. 2, whereby the necessary adjustment may be made from time to time. The recess 15 in the face of the knife-body is provided to enable the head of the bolt lying in the slot 17 to be withdrawn from all possible contact with the face of the stave-bolt. Upon the vertical edge of the chamfering-section 21 is formed a flange 26, having a cutting-edge, which is practically an extension of the edge of the chamfering-cutter 2 and arranged at such an angle therewith as to cut partly through the thickness of the stave and aid in rounding or otherwise properly forming the end edge or the edge of the chine. The complete severing of the stave and the finishing shape of its edge at the end is accomplished by the rib-removing knife 27, the single and duplex forms of which are shown in Figs. 18 and 19, respectively. Each form consists of a cutting-blade, usually straight-edged, beveled to a cutting-edge upon the side which is turned away from the stave-block and provided with a V-shaped or angular cutting portion 28, which may, however, be of any form required by the particular shape to be given to the end of the stave. The principal difference between the single and duplex form of rib-removing knives consists in the location of the cutter 28. In the single knife (shown in Fig. 18) it is between one end and the center of the blade, while in the duplex knife it is substantially central.

The crozing and chamfering knife 14 (shown in Figs. 11 and 12) is employed at the points beyond which no contiguous staves are formed, or, in other words, near the ends of the stave-bolt, and a single rib-removing knife (shown in Fig. 18) is used in conjunction with each single crozing and chamfering knife. When the machine is equipped for the formation of two staves, as shown in Figs. 1, 3, and 4, a duplex crozing and chamfering knife 29 will be arranged centrally upon the knife-supporting bar, such knife being substantially the duplicate of the single knife shown in Fig. 11. It consists of two chamfering portions or sections 21, which unite at their adjacent sides with a duplex severing and shaping cutter 30 of suitable form, its converging cutting-edges meeting at a point 31, which is central. The chamfering portions 21 are inclined at opposite angles and each unites with a crozing-cutter 24, beyond which, upon each side, extends a cutting portion 23. The duplex knife is provided with a double-recessed portion 15, in which are formed bolt-openings 17, one upon each side of the central line, and upon the sides are formed the ribs 16. The only feature of the duplex knife differing from those found in the single knife is the omission of the lateral extension 19. It equalizes, chamfers, and crozes the contiguous ends of the two staves simultaneously and at the same time partly severs them and shapes the edges at their ends, the severance and shaping being completed by the central cutting portion of the duplex rib-removing knife 27. (Shown in Fig. 19.)

When the machine is equipped for the formation of more than two staves at each operation, the duplex tools (shown in Figs. 15 and 19) are arranged at the several points of severance of adjacent staves, the single cutters shown in Figs. 11 and 18 being used at or near the ends of the stave-block or at each extremity of the knife-supporting bar.

In the manufacture of certain varieties of staves it is usual to croze and chamfer one end only, the other being shaped in any suitable or preferred manner. In forming this class of staves upon my machine it is usual to substitute for the duplex crozing and chamfering cutter or cutters 29 a duplex severing and trimming or shaping knife 32. (Shown in Fig. 16.) This knife consists of a blade curved longitudinally, as are the crozing and chamfering knives 14 and 29, to correspond with the transverse curvature of the stave-cutting knife 10, its cutting-edge being usually straight, or substantially so, and provided with a central angular cutter 33, having a shape suitable for the formation of the ends of adjacent staves in which no croze or chamfer is required. The shape of this central cutter may be considerably varied in order to produce any configuration of the contiguous ends of the staves that may be desired. I have shown two different varieties of construction of this type in the drawings, the staves illustrated in Figs. 8 and 10 being substantially those produced by the cutter shown in Figs. 16 and 17. The stave shown in Fig. 9, having a rabbet 34 at one end, is produced in a similar manner, the rabbet being formed by a suitably-shaped cutter. The severing and shaping cutters 32 are so formed that they may be substituted for the duplex crozing and chamfering knives 29 at the points where the latter are used. Said cutters 32, therefore, are provided with slots 17, formed in a recessed part 15, having ribs 16 on the sides or lateral edges.

In some cases I may substitute for the crozing and chamfering cutters 14 or 29 a crozing, chamfering, and howeling cutter 35. (Shown in Figs. 13 and 14.) This cutter is very similar to the one shown in Figs. 11 and 12, the essential difference being that the crozing portion 24 of the cutter is formed centrally in a broad shallow channel or seat 36. (Clearly shown in Figs. 13 and 14.) This howeling-knife in other respects corresponds substantially with the crozing and chamfering knife shown in Figs. 11 and 12, as it has the chamfering and severing portions 21 and 26 shown in said figures and is recessed on its face and provided with the bolt-opening 17 and rib 16, and is in all respects capable of being substituted in place of the ordinary chamfering and crozing knife. It may also be of duplex form, if desired, and substituted for the knife shown in Fig. 15.

The rib-removing knives 27 are mounted upon brackets consisting of a flat base-piece 37, from which rise standards 38, Figs. 1, 2, and 3. The base-piece 37 rests upon a rearwardly-extended flat bar 1$^a$ on the guide-supporting bar 1, so that the standards 38 rise behind the knife and at an acute angle therewith; or, to speak more exactly, at such an angle that if the plane of the knife 27 and the curved face of the knife be both extended downward their edges will be tangent one to the other. The rib-removing knife rests against the forward faces of the standards 38, the bevel of its edge being turned away from the stave-cutting knife and its upper edge lying beneath lugs or shoulders 39 on the tops of the standards 38, set-bolts 40 being tapped through said lugs to give adjustment to the knife. In rear of the base-piece 37 rise lugs 41 on the guide-supporting bar 1, one near each end of the base-piece, set-bolts 42 being tapped through the lugs to give the proper adjustment of each end of the rib-removing knife independently. At each end of the base-piece is a lug or block 43, with a set-bolt 44 to provide for longitudinal adjustment, and from the rear edge of the base-piece 37 a shoulder 45 drops below the rear edge of the flat bar 1$^a$, a set-bolt 46 being tapped through to rest against and engage with the edge of the bar 1$^a$. Fastening-screws 47 lie in slots 48 in the base-piece and are tapped into the bar 1$^a$ to secure the parts in the position to which they are adjusted. The forward edge of the base-piece is usually cut away sufficiently to permit the guides 3 to rise to or a little above the lower sides of the knee-standards 38, which rest thereon or in rabbets in the ends of said guides. The knives 27 are secured to the standards 38 by set-screws 49, passing through the slots 17 in the rib-removing knife and into the standards. The single form of rib-removing knives (shown in Fig. 18) is usually employed at the ends of the stave block or bolt, the narrower portion of the blade, which is included between one end and the non-central severing-cutter 28, projecting beyond the end of the stave-bolt and removing the surplus left by the formation of the end of the stave. It will be seen from Fig. 5 that the severing portions 28 have their apices lying in or very nearly in the line of action of the apices of the corresponding portions 26 of the crozing and chamfering knife 14. The double form of rib-removing knife (shown in Fig. 19) is used at the point or points where the contiguous ends of adjacent staves are formed by the duplex knife 29, (shown in Fig. 15,) its central severing-cutter 28 acting in conjunction with the corresponding cutter 30 of the duplex knife 29.

The stave bolt or block, which is not illustrated in this case, but is fully shown in my pending application, referred to hereinbefore, is supported by a table 50, having pivotal support upon the end frames 2 at the points 51, which are coincident with the centers from which the guides 3 are curved and coincident, also, with the center of the transverse line of curvature of the stave-cutting knife 10, the oscillating edge of the table closely approaching the concave face of the knife and being preferably provided with a steel edge-plate 52, Fig. 2. The table is oscillated by an arm 53, operated by a pitman connection of any suitable form.

I do not confine myself to the employment of a bolt-carrying table which oscillates, nor to the stave-cutting knife standing stationary while severing the staves. Again, I do not confine my invention to the construction of the stave-cutting knife in a plurality of parts or sections, nor do I restrict myself to a knife formed in a single piece, as I may use either construction. Neither do I restrict my invention to any special form of knife used for shaping that end of the stave which is not crozed or chamfered, as I may use any form adapted to produce the shape.

Throughout the specification I have spoken of the knives 27 as the "rib-removing" knives. The additional functions of said knives—viz., the removal of the residue left on the stave-bolt beyond the end of the stave, as well as the removal of the small residue left by the chine-cutters or chamfering-knives 21—are proper adjuncts of the rib-removing knife, which also has a severing-cutter 28 to act in conjunction with the severing and shaping cutter 26 on the chamfering and crozing knife.

The rib-removing knives I have described as mounted on bracket-plates 37 and standards 38 and combined with described means for effecting the several necessary adjustments. While I prefer a construction substantially similar to that described, it should be understood that I do not restrict my invention thereto, as I may substitute any devices which subserve the essential functions.

What I claim is—

1. In a stave-cutting machine, the combination, with a table on which the stave-bolt is placed, of a knife adapted to cut at one operation a plurality of staves and provided at its ends and intermediate thereof with crozing, chamfering, and equalizing knives to cut, chamfer, croze, and equalize a plurality of staves at a single operation, substantially as described.

2. In a stave-cutting machine, the combination, with a table on which the stave-bolt is placed, of a knife adapted to cut from the stave-bolt a plurality of staves at one operation, chamfering, crozing, and equalizing cutters arranged at the ends of said knife and intermediate thereof, and rib-removing knives arranged to remove the residual ribs formed on the stave-bolt by the crozing of the staves cut therefrom, substantially as described.

3. In a stave-cutting machine, the combination, with a table on which is placed the stave-bolt, of a knife adapted to cut therefrom at one operation a plurality of staves, crozing, chamfering, and equalizing knives arranged at the ends of said knife and intermediate of said ends, and rib-removing knives to remove the residual ribs formed on the stave-bolt by crozing the staves cut therefrom, said rib-removing knives having equalizing or severing and shaping cutters, which act in conjunction with the equalizing or severing cutters on the crozing and chamfering knives, substantially as described.

4. In a stave-cutting machine, the combination, with a table on which the stave-bolt is placed, of a knife consisting of a plurality of stave-cutting sections to cut from the stave-bolt a plurality of staves at one operation, crozing and chamfering knives having equalizing-cutters and arranged at the two outer or extreme ends of said knife and between the stave-cutting sections thereof, and rib-removing knives arranged to remove the residual ribs from the stave-bolt and to act conjointly with the equalizing-cutters on the crozing and chamfering knives to shape and sever the ends of the staves, substantially as described.

5. In a stave-cutting machine, the combination, with a stave-cutting knife consisting of a plurality of stave-cutting sections, of crozing and chamfering knives and shaping or end-forming knives arranged at suitable points relatively to the crozing and chamfering knives, whereby a plurality of staves are severed from the stave-bolt at each single operation and simultaneously crozed and chamfered at one end and suitably shaped at the other end, substantially as described.

6. In a stave-cutting machine, a knife consisting of a plurality of stave-cutting sections, each curved longitudinally to correspond with the bilge of the barrel or other article formed from said stave and adapted to cut in a curved line corresponding with the circular body of said barrel or article, crozing and chamfering knives having equalizing-cutters at the two extremities of said knife and intermediate thereof, and suitable rib-removing knives, substantially as described.

7. In a stave-cutting machine, the combination, with a plurality of stave-cutting knives arranged to act simultaneously upon a stave-bolt, of adjustable crozing and chamfering knives and adjustable shaping-knives to act upon the ends of the staves, substantially as described.

8. In a stave-cutting machine, the combination, with a series of stave-cutting knives, each longitudinally and transversely curved and acting simultaneously to sever from a stave-bolt a plurality of longitudinally and transversely curved staves, of crozing and chamfering knives arranged at the ends of each stave-cutting knife and having a suitable longitudinal curve to cut in the same line of transverse curvature with the stave-cutting knives, substantially as described.

9. In a stave-cutting machine, the combination, with a plurality of stave-cutting knives arranged to act simultaneously on a stave-bolt, of crozing and chamfering knives arranged at the ends of the stave-cutting knives and having equalizing-cutters, adjustable rib-removing knives mounted on brackets on a guide-supporting bar, and means for giving a vertical and a universal horizontal adjustment to said knives, substantially as described.

10. In a stave-cutting machine, the combination, with a knife consisting of a plurality of stave-cutting portions, of crozing and chamfering knives arranged at the ends of the outer or extreme stave-cutting portions, each having a chamfering-cutter and a trimming-cutter, the latter continuous with the stave-cutting knife and the former arranged at an angle therewith, a crozing-cutter being interposed between, forming an integral part of said cutters, the chamfering-cutter being, also, provided with an equalizing and severing cutter, and a duplex knife arranged between the contiguous ends of said stave-cutting knives and consisting of a central equalizing and severing cutter joined to blades which extend laterally, substantially as described.

11. In a stave-cutting machine, the combination, with a knife consisting of a plurality of stave-cutting portions adapted to act simultaneously upon a stave-bolt, of a crozing and chamfering knife having a trimming and a chamfering cutter arranged at a suitable relative angle and provided with a crozing-cutter lying between and connecting said cutters, the chamfering-cutter having an equalizing and severing cutter, a duplex knife arranged between the ends of the adjacent stave-cutting sections and having a central equalizing and severing cutter and two chamfering and two trimming cutters, with two crozing-cutters intermediate the chamfering and trimming cutters, and a table on which the stave-bolt is placed, substantially as described.

In testimony whereof I have hereunto set my hand and affixed my seal in presence of two subscribing witnesses.

CHARLES WILLIS RICH. [L. S.]

Witnesses:
G. H. BENNETT,
F. L. RICH.